US006942054B2

(12) United States Patent
Kim

(10) Patent No.: US 6,942,054 B2
(45) Date of Patent: Sep. 13, 2005

(54) FOUR-WHEEL DRIVE APPARATUS USING MOTOR, AND METHOD THEREOF

(75) Inventor: Jong Hun Kim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/665,589

(22) Filed: Sep. 19, 2003

(65) Prior Publication Data

US 2004/0226763 A1 Nov. 18, 2004

(30) Foreign Application Priority Data

May 14, 2003 (KR) ................................ 10-2003-0030557

(51) Int. Cl.[7] ................................ B60K 17/356
(52) U.S. Cl. ....................... 180/243; 180/65.2; 180/248
(58) Field of Search ............................... 180/243, 65.2, 180/65.3, 65.4, 248; 477/5

(56) References Cited

U.S. PATENT DOCUMENTS 4,757,870 A * 7/1988 Torii et al. .................. 180/233
5,982,045 A * 11/1999 Tabata et al. ................. 290/17
5,988,307 A * 11/1999 Yamada et al. ............. 180/243
6,549,840 B1 * 4/2003 Mikami et al. ............... 701/69
6,726,593 B2 * 4/2004 Yamamoto et al. ............ 477/5
6,729,426 B2 * 5/2004 Suzuki ....................... 180/197
2002/0019284 A1 * 2/2002 Aikawa et al. ............. 475/150
2002/0139592 A1 * 10/2002 Fukasaku et al. .......... 180/65.2
2004/0050599 A1 * 3/2004 Krzesicki et al. .......... 180/65.3

FOREIGN PATENT DOCUMENTS

| | | |
|---|---|---|
| JP | 07-231508 | 8/1995 |
| JP | 2000-272367 | 3/2000 |
| JP | 2001-239852 | 9/2001 |
| JP | 2002-160541 | 6/2002 |

* cited by examiner

*Primary Examiner*—Lesley D. Morris
*Assistant Examiner*—Daniel Yeagley
(74) *Attorney, Agent, or Firm*—Morgan Lewis & Bockius LLP

(57) ABSTRACT

In the case four-wheel drive is required, a generator connected to an engine generates electric current, which is supplied to a motor such that a rear wheel shaft can be driven by a driving force transferred through a clutch interposed between the motor and the rear wheel shaft. Accordingly, slippage of the vehicle wheels is prevented and safety of the vehicle is improved.

5 Claims, 4 Drawing Sheets

FOUR-WHEEL DRIVE APPARATUS USING MOTOR, AND METHOD THEREOF

CROSS-REFERENCE TO RELATED APPLICATIONS

This application claims priority of Korean Application No. 10-2003-0030557, filed on May 14, 2003, the disclosure of which is incorporated fully herein by reference.

FIELD OF THE INVENTION

Generally, the present invention relates to a four-wheel drive apparatus and method. More particularly, the present invention relates to a four-wheel drive apparatus and a four-wheel drive method that enable the rear wheel shaft to be driven when a front wheel shaft is driven by an engine.

BACKGROUND OF THE INVENTION

Four-wheel drive is a type of drive system in which both front wheels are connected to their own differential and axles, and both rear wheels are connected to their own differential and axles. Between these two differentials, a transfer case is provided so as to transfer driving force.

Four-wheel drive enables a vehicle to travel off-road or on a declined road, and makes it easier to drive in snow such that the safety of the vehicle is improved.

However, because the conventional four-wheel drive system is provided with a transfer case, efficiency of transferring driving force is lower than with two-wheel drive, and the gross weight of the vehicle substantially increases.

SUMMARY OF THE INVENTION

An exemplary four-wheel drive apparatus according to an embodiment of the present invention comprises a generator connected to an engine of a vehicle for generating electric current, a motor driven by the electric current supplied from the generator, and a clutch interposed between the motor and a rear wheel shaft for transferring a driving force.

In a further embodiment, the four-wheel drive apparatus further comprises speed sensors for detecting RPM of both a front wheel shaft and the rear wheel shaft, and a controller for controlling the motor based on the detected RPM of the front wheel shaft and that of the rear wheel shaft.

In another further embodiment, the four-wheel drive apparatus further comprises a sensor for detecting RPM of the motor.

Preferably, the motor is controlled in a pulse width modulation (PWM) manner.

An exemplary four-wheel drive method for driving a rear wheel shaft in addition to a front wheel shaft according to an embodiment of the present invention comprises determining if four-wheel drive is required, generating electric current utilizing a generator connected to an engine, driving a motor with the electric current supplied from the generator, and driving the rear wheels with driving power transferred from the motor through a clutch.

In a further embodiment, the determining if four-wheel drive is required comprises detecting RPM of the front wheel shaft and the rear wheel shaft, computing a difference between RPM of the front wheel shaft and that of the rear wheel shaft, and determining if the computed difference is higher than a predetermined value.

In the case that the computed difference is higher than the predetermined value, it is determined that four-wheel drive is required.

In another further embodiment, generating electric current comprises computing a torque of the motor required for compensating for the difference between the RPM of the front wheel shaft and that of the rear wheel shaft, and generating electric power based on the required torque.

Preferably, the generator is controlled in a manner of PWM and feedback control.

In another further embodiment, the driving of the motor comprises detecting RPM of the motor, applying stator current to a stator of the motor based on the detected RPM of the motor, and applying rotor current originating from the generator to a rotor of the motor.

In another further embodiment, the driving of the rear wheel shaft with a driving force transferred from the motor through a clutch comprises determining if the RPM of the motor matches the RPM of the rear wheel shaft, connecting the motor to the rear wheel shaft through the clutch when the RPM of the motor matches the RPM of the rear wheel shaft, and accelerating the motor if the RPM of the motor does not yet match the RPM of the rear wheel shaft.

DETAILED DESCRIPTION OF THE PREFERRED EMBODIMENTS

A preferred embodiment of the present invention will hereinafter be described in detail with reference to the accompanying drawings.

Figure 1:
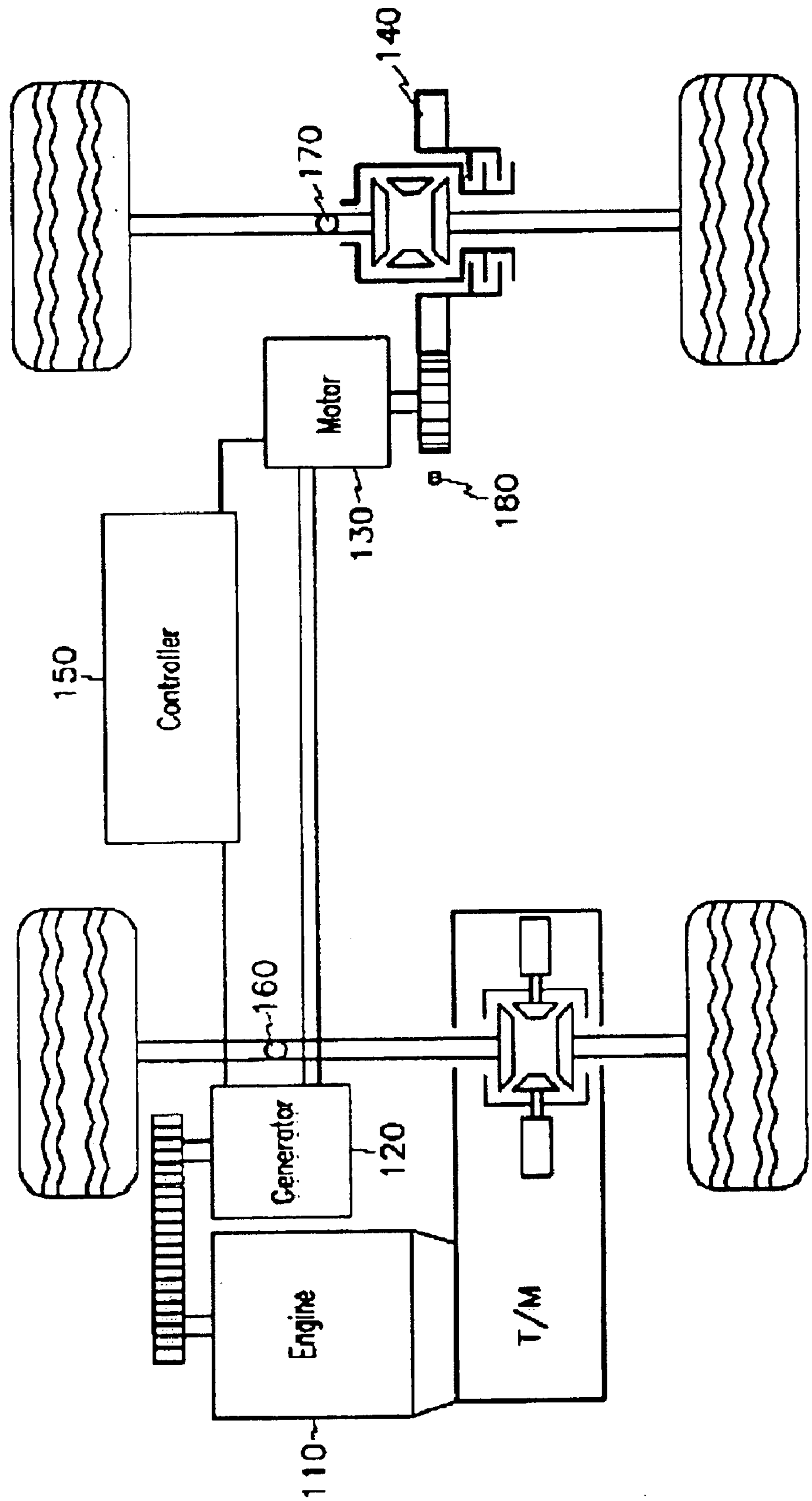
FIG. 1 is a block diagram of the four-wheel drive system according to an embodiment of this invention.

As shown in FIG. 1, a four-wheel drive apparatus for a vehicle according to a preferred embodiment of the present invention comprises a generator 120 connected to an engine 110 for generating electric current, a motor 130 driven by the electric current supplied from the generator 120, a clutch 140 interposed between the motor 130 and a rear wheel shaft for transferring driving force, and a controller 150.

The generator 120 is connected to the engine 110 with a drive chain or drive belt such that electric current is generated. The generator 120 is preferably a DC generator.

The electric current generated by the generator 120 is supplied to the stator of the motor 130 for driving the motor 130. In this embodiment, the motor is provided as a shunt-wound DC motor so that rotor current as well as stator current can be controlled. Accordingly, both the torque and RPM of the motor 130 can be simultaneously adjusted by controlling the stator current and the rotor current.

A driving gear of the motor is meshed with a driven gear of the clutch 140 so that the driving power is transferred from the motor to the rear wheel shaft when the clutch is engaged.

Speed sensors 160, 170 respectively detect RPM of the front wheel shaft and the rear wheel shaft such that the detected RPM of the front wheel shaft and that of the rear wheel shaft are transmitted to the controller 150.

The controller 150 controls the generator 120, the motor 130, and the clutch 140 based on the RPM of the rear wheel shaft.

When controlling the generator 120 and motor 130, the controller 150 controls the generator 120 and the motor 130 in a pulse width modulation (PWM) manner.

Figure 2:
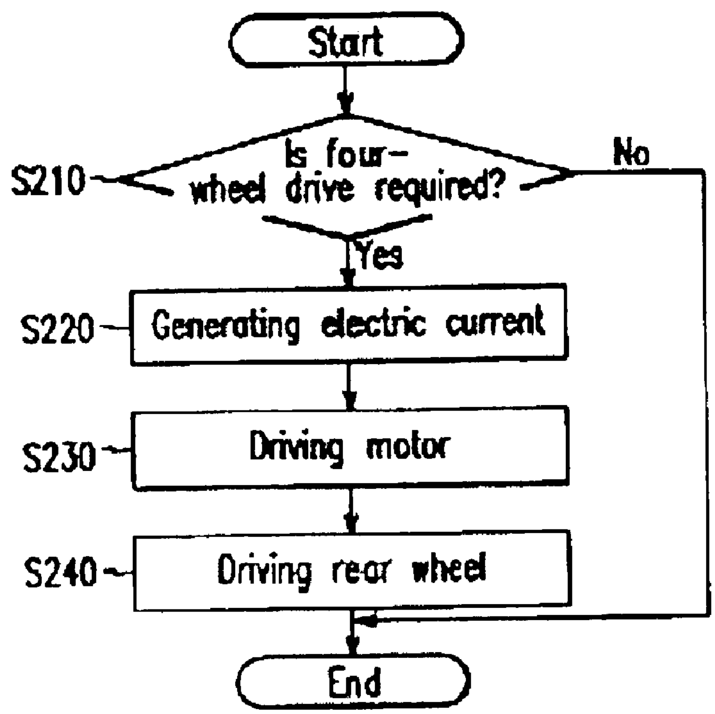
FIG. 2 is a flow chart of a method of four-wheel drive according to an embodiment of this invention.

FIG. 2 is a flow chart illustrating a four-wheel drive method according to an embodiment of this invention.

As shown in FIG. 2, the four-wheel drive method comprises determining if four-wheel drive is required at step S210, generating electric current utilizing a generator 120 connected to an engine 110 at step S220, driving a motor 130 with electric current from the generator 120 at step S230, and driving the rear wheel shaft by engaging the clutch 140 thereby transmitting driving force through the driving gear of the motor 130 to the driven gear of the clutch 140 and thence to the rear wheel shaft at step S240.

The speed sensors 160, 170 respectively detect RPM of the front wheel shaft and rear wheel shaft, which are transmitted to the controller 150.

The controller determines if the difference between RPM of the front wheel shaft and that of the rear wheel shaft is higher than a predetermined value. In the case that the difference is higher than the predetermined value, the controller determines that four-wheel drive is required.

Hereinafter, in the case that four-wheel drive is required, the processes of controlling the generator 120, the motor 130, and the clutch 140 will be described.

Figure 3:
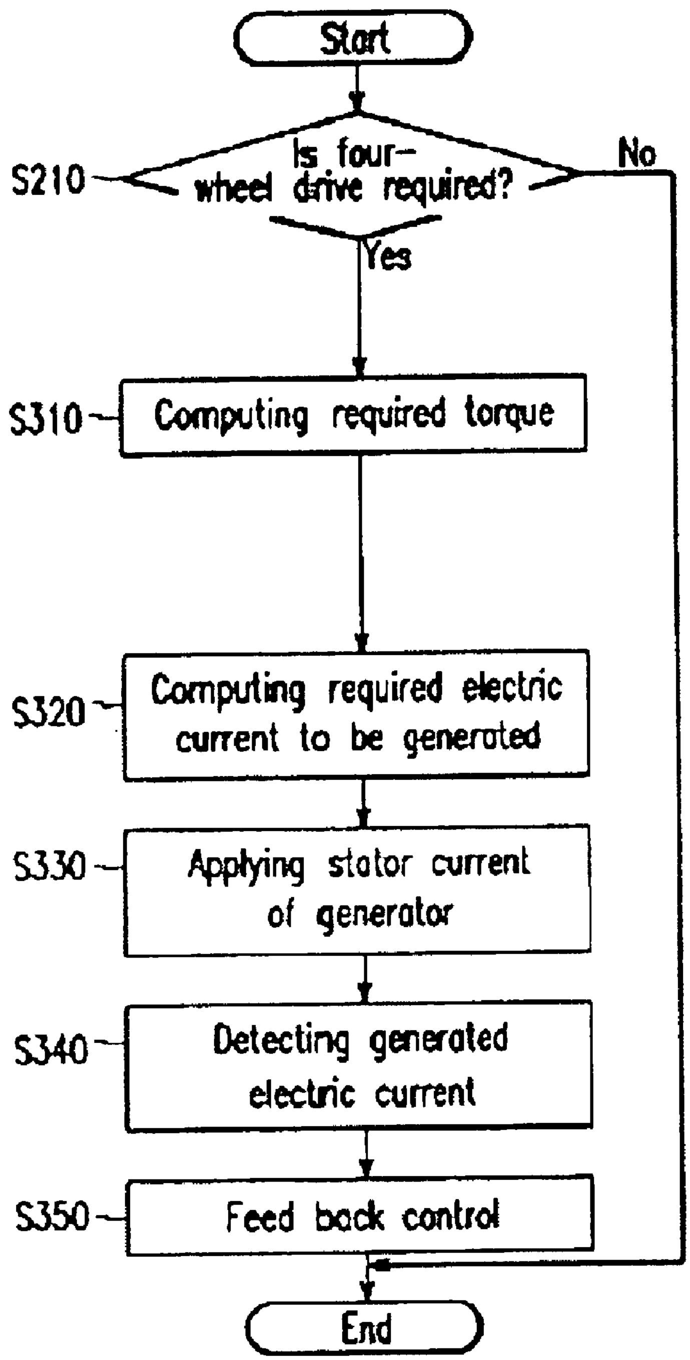
FIG. 3 is a flow chart of controlling the generator generating electric current.

As shown in FIG. 3, when four-wheel drive is required, the controller 150 computes the torque required by the rear wheels at step S310.

The torque required by the rear wheel shaft is typically proportional to a difference between RPM of the front wheel shaft and that of the rear wheel shaft.

Preferably, the amount of torque required can be obtained from a predetermined map based on the difference between RPM of the front wheel shaft and that of the rear wheel shaft.

Subsequently, the controller 150 computes electric current that is required to be generated by the generator 120 based on the required torque at step S320, and applies stator current to the stator of the generator 120 based on the required electric current at step S330.

The controller 150 detects the electric current generated by the generator 120 at step S340, and executes feedback control at step S350.

The generated electric current is supplied to the rotor of the motor 130 such that an armature field is formed. Accordingly, the torque of the motor 130 can be controlled by adjusting the generated electric current.

Figure 4:
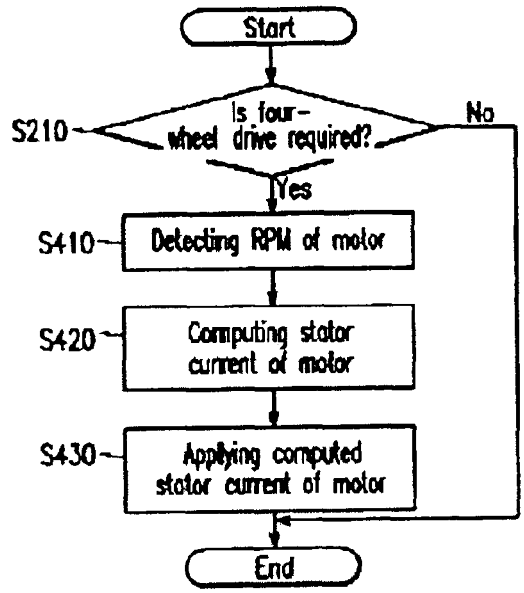
FIG. 4 is a flow chart of controlling the motor driven by electric current supplied from the generator.

As shown in FIG. 4, in the case that four-wheel drive is required, the controller 150 detects RPM of the motor at step S410.

Subsequently, the controller 150 computes stator current of the motor 130 based on the detected RPM of the motor 130 at step S420.

Preferably, the stator current can also be obtained from a predetermined map.

The controller 150 applies the computed stator current to the stator of the motor at step S430.

Figure 5:
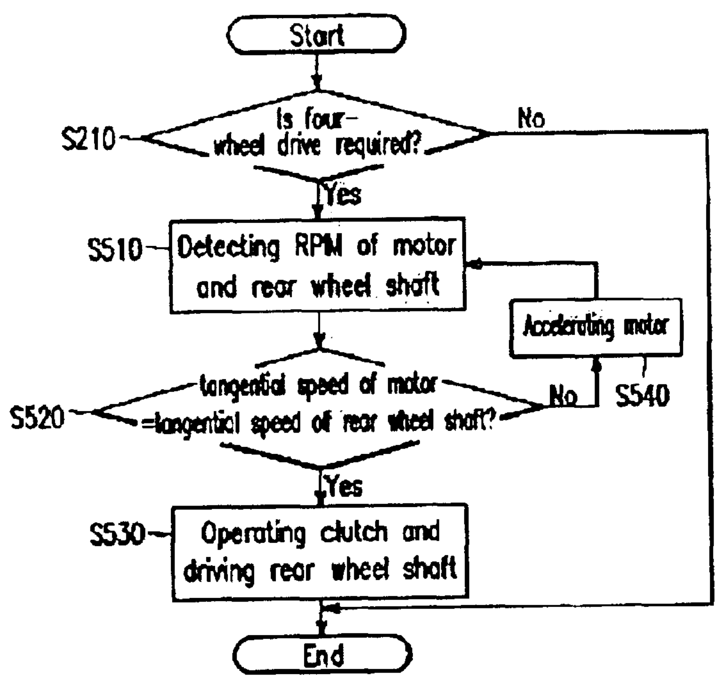
FIG. 5 is a flow chart of controlling the clutch transferring the driving power from the motor to a rear wheel shaft.

As shown in FIG. 5, in the case that four-wheel drive is required, a speed sensor 180 of the motor detects RPM of the motor 130 and the speed sensor 170 of the rear wheel shaft detects RPM of the rear wheel shaft at step S510.

The clutch 140 is interposed between the motor 130 and the rear wheel shaft so as to transfer the driving force thereto. When the difference between the RPM of the motor and that of the rear wheel shaft is substantially high, a shock can occur during the engagement therebetween.

Accordingly, the controller 150 determines if the RPM of the motor matches the RPM of the rear wheel shaft at step S520. When they do not yet match, the controller 150 accelerates the motor 130 at step 540. On the other hand, when the RPM of the motor matches the RPM of the rear shaft, the controller 150 operates the clutch 140 such that the driving force is transferred from the motor 130 to the rear wheel shaft at step S530.

According to a preferred embodiment of the present invention, the generator connected to the engine generates electric current such that the motor connected to the generator can be driven. Driving force from the motor is then transferred to the rear wheel shaft such that four-wheel drive can be realized.

The motor can be controlled with accuracy and quick response. Whether four-wheel drive should be operated is determined based on the difference in RPM of the front wheel shaft and the rear wheel shaft, such that wheel slip can be prevented and the safety of the vehicle can be improved.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A four-wheel drive apparatus for a vehicle, comprising:

an engine for driving a front wheel shaft of the vehicle;

a generator connected to the engine for generating electric current;

a motor driven by the electric current supplied from the generator; and a clutch interposed between the motor and a rear wheel shaft for transferring a driving force thereto, further comprising:

a first speed sensor for detecting RPM of the front wheel shaft;

a second speed sensor for detecting RPM of the rear wheel shaft; and a controller, wherein the controller controls the motor based on a difference between the RPM of the front wheel shaft and that of the rear wheel shaft, wherein the four-wheel drive apparatus further comprising a third speed sensor for detecting RPM of the motor, wherein the controller controls the clutch based on a difference between the RPM of the rear wheel shaft and that of the motor.

2. The four-wheel drive apparatus of claim 1, wherein the motor is controlled in a PWM manner.

3. A four-wheel drive method for driving a rear wheel shaft in addition to a front wheel shaft, comprising:

determining if four-wheel drive is required;

generating electric current utilizing a generator connected to an engine;

driving a motor with electric current supplied from the generator; and driving the rear wheel shaft with a driving force transferred from the motor through a clutch, wherein the determining if four-wheel drive is required comprises:

detecting RPM of the front wheel shaft and the rear wheel shaft;

computing a difference between the RPM of the front wheel shaft and that of the rear wheel shaft; and determining if the computed difference is higher than a predetermined value, wherein if the difference between the RPM of the front wheel shaft and that of the rear wheel shaft is higher than the predetermined value, four-wheel drive is determined to be required, wherein the generating of electric current comprises computing a torque of the motor required for compensating for the difference between the RPM of the front wheel shaft and the rear wheel shaft; and generating electric current based on the required torque, wherein the driving of the motor with electric current supplied from the generator comprises detecting RPM of the motor; applying stator current to a stator of the motor based on the RPM of the motor; and applying rotor current to a rotor of the motor with the generated electric current from the generator.

4. The four-wheel drive method of claim 3, wherein the generating electric current is executed in a feedback control manner.

5. The four-wheel drive method of claim 6, wherein the driving of the rear wheel shaft with a driving force transferred from the motor comprises:

determining if the RPM of the motor matches the RPM of the rear wheel shaft;

connecting the motor to the rear wheel shaft through the clutch if the RPM of the motor matches the RPM of the rear wheel shaft; and accelerating the motor if the RPM of the motor does not yet match the RPM of the rear wheel shaft.

* * * * *